United States Patent

Hutchin

Patent Number: 5,161,045
Date of Patent: Nov. 3, 1992

[54] LARGE FIELD OF VIEW LIGHT BEAM TRANSCEIVER HAVING SMALL MOTION OF OPTICS

[75] Inventor: Richard A. Hutchin, Redondo Beach, Calif.

[73] Assignee: The United States of America as represented by the Secretary of the Air Force, Washington, D.C.

[21] Appl. No.: 545,269

[22] Filed: Jun. 28, 1990

[51] Int. Cl.$^5$ .................. G02B 26/08; G02B 27/44
[52] U.S. Cl. ................... 359/197; 359/563; 359/577
[58] Field of Search ............... 350/6.1–6.91, 350/162.11, 162.13, 162.16, 162.23, 162.17, 167; 356/353–359, 152, 338; 250/201.9; 359/618–624, 900–903, 196–226, 558–579

[56] References Cited

U.S. PATENT DOCUMENTS

| | | | |
|---|---|---|---|
| 3,829,219 | 8/1974 | Wyant | 356/353 |
| 4,305,643 | 12/1981 | Tosswill | 350/167 |
| 4,402,607 | 9/1983 | McVay et al. | 356/338 |
| 4,467,186 | 8/1984 | Goralnick et al. | 250/201.9 |
| 4,518,854 | 5/1985 | Hutchin | 356/354 |
| 4,621,897 | 11/1986 | Bonnet | 350/167 |
| 4,624,563 | 11/1986 | Johnson | 356/152 |
| 4,626,100 | 12/1986 | Johnson | 356/152 |
| 4,668,080 | 5/1987 | Gale et al. | 355/77 |
| 4,679,901 | 7/1987 | Dammann et al. | 359/575 |
| 4,708,436 | 11/1987 | Kleinknecht | 359/575 |
| 4,733,944 | 3/1988 | Fahlen et al. | 350/167 |
| 4,737,621 | 4/1988 | Gonsiorowski et al. | 250/201.9 |
| 4,776,669 | 10/1988 | Dammann et al. | 359/566 |
| 4,851,978 | 7/1989 | Ichihara | 350/167 |
| 4,924,082 | 5/1990 | Opheij et al. | 350/162.21 |

FOREIGN PATENT DOCUMENTS 231311 9/1988 Japan ................ 359/566

Primary Examiner—Bruce Y. Arnold
Assistant Examiner—Thong Nguyen
Attorney, Agent, or Firm—Robert L. Nathans; Donald J. Singer

[57] ABSTRACT

Coherent light from a laser is directed through first and second two dimensional planar arrays of lenslets which are moved relative to each other to enable the beam to point along any diffraction order, and fine pointing of the beam between orders is accomplished by slightly changing the angle of incidence of the beam with respect to the arrays. The laser is replaced by a photoreceptor when the scanner operates as a light beam receiver.

7 Claims, 1 Drawing Sheet

LARGE FIELD OF VIEW LIGHT BEAM TRANSCEIVER HAVING SMALL MOTION OF OPTICS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of light beam scanners.

There is a need for a large beam scanner for producing rapid and precise scanning of a light beam over a given field of view, with small motions of the optical components. Large motions of optical components used to steer the beam require high rates of acceleration for rapid positioning. Such rates of acceleration require larger, more costly actuators, consuming large amounts of power. Furthermore, high acceleration rates induce greater stress in the components, which could adversely affect component reliability and good optical quality.

BRIEF SUMMARY OF THE INVENTION

The above stated need has been fulfilled in accordance with a preferred embodiment of the invention, whereby coherent light is directed through first and second two-dimensional planar arrays of lenslets each of which produces a beamlet, making up the beam. One array is translated relative to the other array enabling the beam to point along any diffraction order where constructive interference of the beamlets will occur. Fine pointing of the beam between orders while still maintaining constructive interference between beamlets, is accomplished by slightly changing the angle of incidence of the beam relative to the planes of the lenslet arrays. A tip/tilt mirror means is optically coupled between a laser and a beam expander for this purpose, to point the output beam of the scanner beam in any direction within the field of view.

Other objects, features and advantages of the present invention will become apparent upon reading of the following description, taken in conjunction with the drawings in which.

SPECIFIC DESCRIPTION OF PREFERRED EMBODIMENTS OF THE INVENTION

Figure 1:
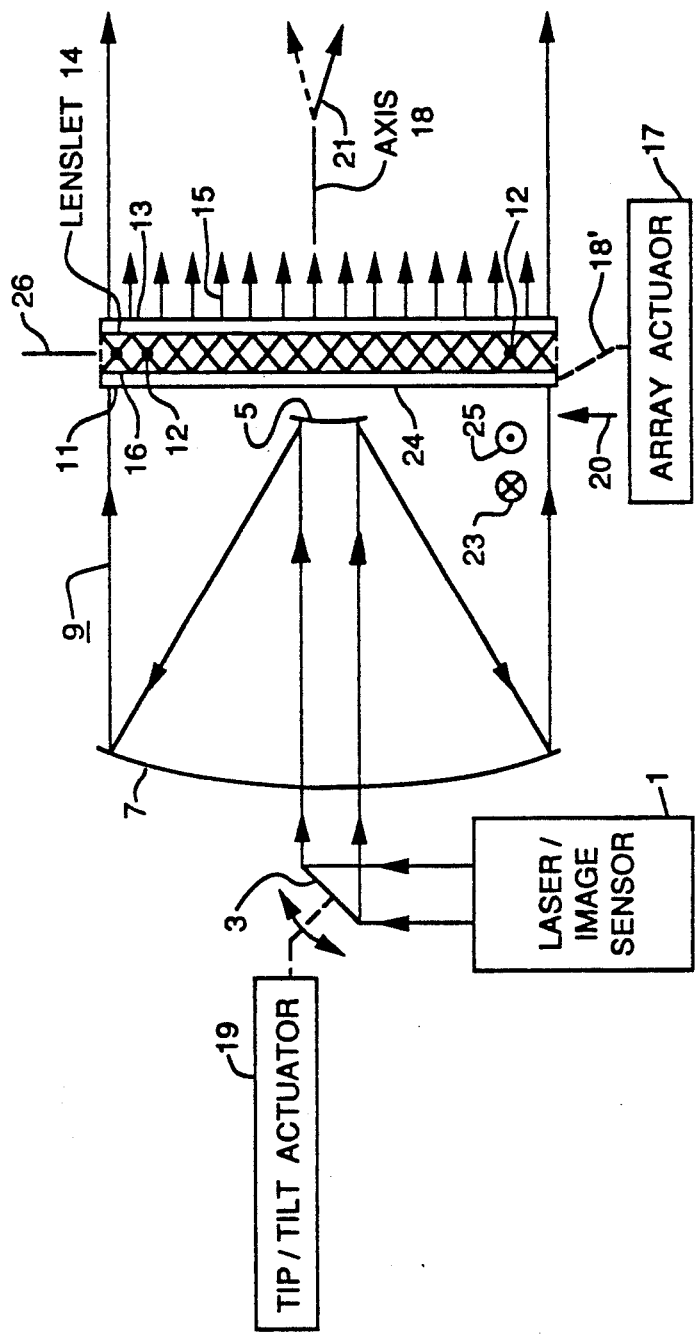
FIG. 1 illustrates a preferred embodiment of the invention.
Figure 2:
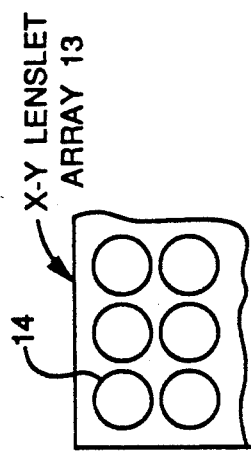
FIG. 2 illustrates a portion of a lenslet array.

In FIG. 1, laser 1 directs coherent light at convex mirror 5 of beam expander 9, via tip/tilt mirror 3. The light rebounds off of concave mirror 7 of the beam expander and the resulting expanded beam enters first planar lenslet array 11, and passes through second planar lenslet array 13.

Each lenslet array comprises a two dimensional X-Y array of lenslets 14, which lie in a common plane as shown. The centers of the lenslets 16 of the first array may be initially aligned with the centers of the lenslets 14 of the second array as indicated. A portion of a lenslet array is also shown in FIG.

As can be seen in FIG. 1, each lenslet in the first lenslet array is separated from each corresponding lenslet in the second lenslet array by the same distance, and the number of lenslets in said first lenslet array are substantially equal to the number of lenslets in said second lenslet array.

Lenslet array 13 acts as a grating and diffracts light 15 exiting the scanner into a two-dimensional array of orders spaced by $\lambda/d$ radians where $\lambda$ is the wavelength of the coherent light and d is the lenslet diameter.

In order to maintain the desired beam brightness, the beamlets must constructively interfere. When the beam is pointed along any diffraction order, the well known grating condition: $sine\theta = m\lambda/d$ is met, where m is an integer, and d is the distance between grating elements, or the grating period, which in this case is equivalent to the lenslet diameters. In our application, since $sin\theta$ is about equal to $\theta$ for small angles, $\theta$ is the angle by which the beamlets corresponding to maxima have been deviated from the optical axis 18.

When the first lenslet array 11 translates across the beam, where the second array is fixed, the beamlets change direction, and can illuminate any one of the orders, thus redirecting the full aperture output beam to any one of the discrete directions corresponding to a given order. For example, if the first array is translated upwardly by an appropriate amount by actuator 17 and linkage 18' in the direction of arrow 20, the position of the light spots 12, focused by lenslets 16 of the first array in the focal plane 26 between the arrays, will also be shifted upwardly, and the recollimated beamlets emerging at the output of the second array will be turned downwardly at the appropriate angle to illuminate a selected order as indicated by arrow 21.

Shifting the relative positions of the arrays is analogous to adjusting the blaze angle of flats of a normal blaze grating in the manner of a venetian blind, thus putting little tilts on output segments of the exiting wavefront, for pointing the beam along a selected order.

Fine pointing of the beam between orders, while maintaining constructive interference between beamlets, is accomplished by slightly changing the angle of incidence of the light directed at input plane 24 of the first array, by an amount of plus or minus $\lambda/2d$ radians. This is accomplished by tip/tilt actuator 9, coupled to mirror means 3. Recall that the angle to maintain the grating condition is the angle by which the rays corresponding to the maxima have been deviated from the direction of the incident light. Thus the final output angle from the second array, pointing between orders, is the sum of the angle $\theta$ meeting the grating condition plus the new slight change in the angle of incidence produced by the change in the tip/tilt mirror position.

Selectively shifting the relative positions of the lenslet arrays in both X and Y, (note arrow tail/head 23, 25) together with the selective slight tipping and tilting of the mirror to change the angel of incident light directed at the first lenslet array by the beam director in two orthogonal directions, which in turn results in redirection of the beam anywhere within the field of view of the scanner, while maintaining the grating condition for constructive beamlet interference. For f/1 lenslets, the field of view of the scanner would be limited to about plus or minus thirty degrees. It is believed that good beam quality would require very exact lenslet tolerances. One or both of the arrays may be moved provided that there be a shift in the relative positions of one array relative to the other. For certain applications the scanner could scan in one direction only whereby the arrays would be translated only in the Y direction for example, so that the lenslet arrays would not be two dimensional as described above. Such arrays would consist of a linear lenslet array rather than an X-Y array, the lenslets would be cylindrical rather than spherical, and mirror 3 would tip but not tilt. Also, the lenslet arrays could have cylindrical or spherical rather than planar surfaces as illustrated. Such arrays could be placed in an expanding or contracting portion of the beam and would have the advantage of maintaining the large field of view while keeping the lenslet arrays smaller for rapid movement with less inertia.

In view of the bidirectionality of light, the light beam scanner can be used as a receiver, rather than as a transmitter, for selectively receiving light beam signals generated by widely separated light beam transmitters, mounted on satellites, for example. As a receiver, the laser 1 could be replaced by photoreceptor means such as a CCD camera for recording selected images in the field of view such as telescopically viewed objects in space. An X-Y CCD image sensor could electronically record a 2-D image for subsequent viewing. Should the distant object be a data modulated light transmitter, mirror 3 could direct incoming light through a focusing lens for focusing the light upon a photodiode for electronic recordation of the data stream. Motion of the arrays and tip/tilt mirror could result in row-by-row sequential scanning or viewing of only small selected segments in the field of view, on a random access basis.

Since numerous variations of the disclosed embodiments will occur to those skilled in the art, the scope of the invention is to be defined only by the language of the following claims.

I claim:

1. A light beam scanner having a given field of view comprising:
   (a) a coherent light beams source for generating a coherent light beam;
   (b) first and second optically coupled lenslet arrays, each having a plurality of lenslets, and configured to diffract light outputted from said second array into a plurality of diffraction orders where constructive interference between beamlets produced by the lenslets of said second array will occur;
   (c) array actuator means for moving said first and second arrays relative to each other across said light beam for causing said beamlets to illuminate any one of said diffraction orders;
   (d) beam director means optically coupled to said coherent light beams source for directing the coherent light beam at said first lenslet array at a given angle of incidence and for changing the angle of incidence of the coherent light beam directed at said first lenslet array, for in turn causing light outputted from said second lenslet array to be redirected within the field of view of the scanner which maintaining constructive interference between said beamlets; and
   wherein said first and second lenslet arrays each comprise a two dimensional array of lenslets, and wherein said array actuator means includes means for producing relative motion between said arrays in both X and Y directions.

2. The light beams scanner of claim 1 wherein said beam director means includes means for changing the angle of incident light directed at said first lenslet array in two orthogonal directions.

3. The light beam scanner of claim 2 including a beam expander optically coupled between said beam director means and said first lenslet array to ensure illumination of substantially all lenslets of said first lenslet array.

4. The light beam scanner of claim 2 wherein said beam director means includes means for changing the angle of incident light by an amount of plus or minus $\lambda/2d$ radians, where $\lambda$ is the wavelength of light and $d$ is the lenslet diameter, so that the combination of moving said first array and said second array relative to each other and actuation of said beam director means enables pointing of the beam in any direction within the field of view of the scanner.

5. The light beam scanner of claim 1 including a beam expander optically coupled between said beam director means and said first lenslet array to ensure illumination of substantially all lenslets of said first lenslet array.

6. A light beam scanner having a given field of view comprising:
   (a) a coherent light beam source for generating a coherent light beam;
   (b) first and second optically coupled lenslet arrays, each having a plurality of lenslets, and configured to diffract light outputted from said second array into a plurality of diffraction orders where constructive interference between beamlets produced by the lenslets of said second array will occur;
   (c) array actuator means for moving said first and second arrays relative to each other across said light beam for causing said beamlets to illuminate any one of said diffraction orders;
   (d) beam director means optically coupled to said coherent light beam source for changing the angle of incidence of light directed at said first lenslet array, for in turn causing light outputted from said second lenslet array to redirect the beam within the field of view of the scanner while maintaining constructive interference between said beamlets; and
   (e) a beam expander optically coupled between said beam director means and said first lenslet array to ensure illumination of substantially all of said first lenslet array.

7. The light beam scanner of any one of claims 1, 2, 3, 4, 5 or 6 wherein each lenslet in the first lenslet array is separated from each corresponding lenslet in the second lenslet array by the same distance, and the number of lenslets in said first lenslet array are substantially equal to the number of lenslets in said second lenslet array.

* * * * *